Aug. 5, 1969  W. E. LERWILL ET AL  3,459,931
METHODS OF AND APPARATUS FOR THE CORRELATION OF TWO VARIABLES
Original Filed May 1, 1963  4 Sheets-Sheet 1
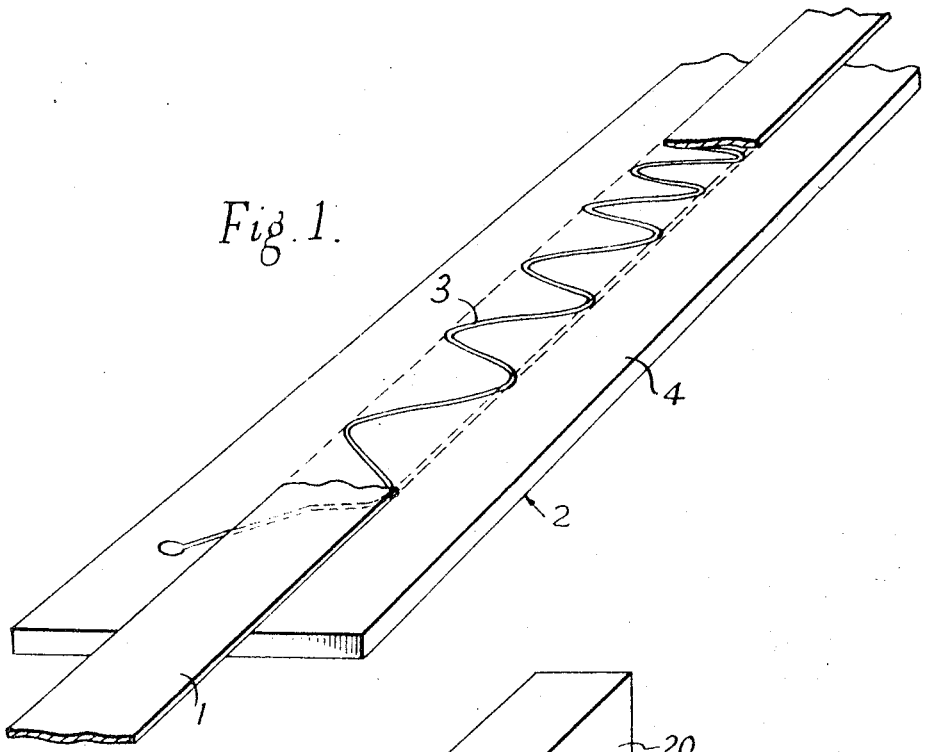
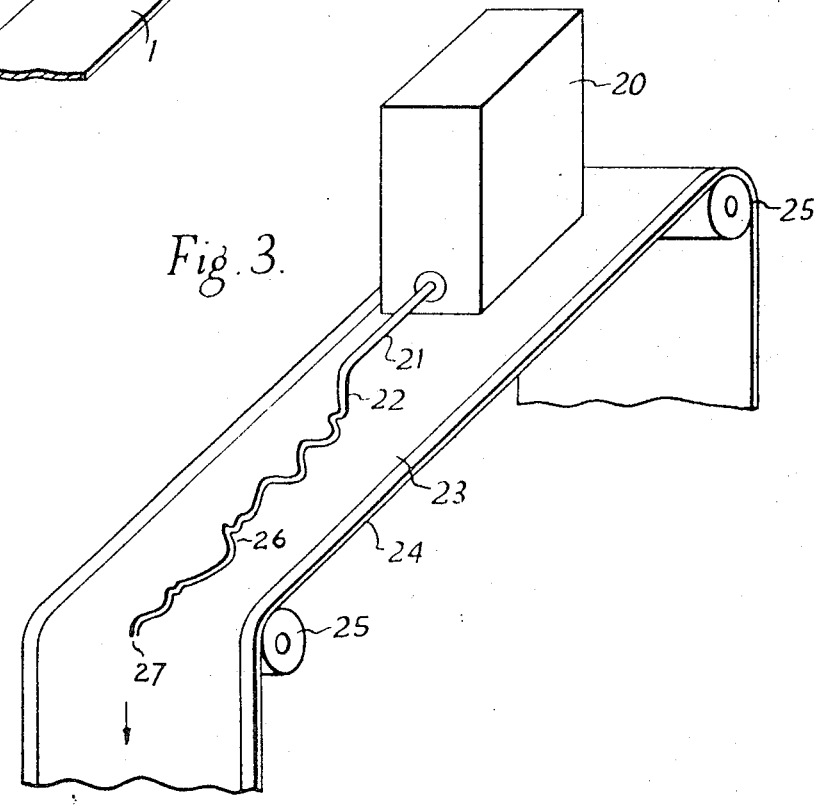

Aug. 5, 1969 W. E. LERWILL ET AL 3,459,931
METHODS OF AND APPARATUS FOR THE CORRELATION OF TWO VARIABLES
Original Filed May 1, 1963 4 Sheets-Sheet 2

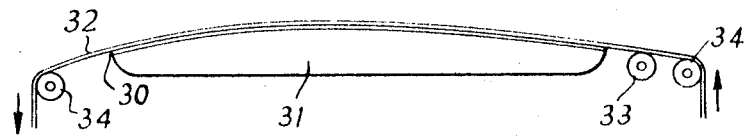
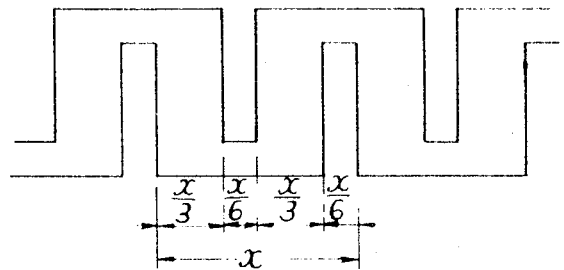
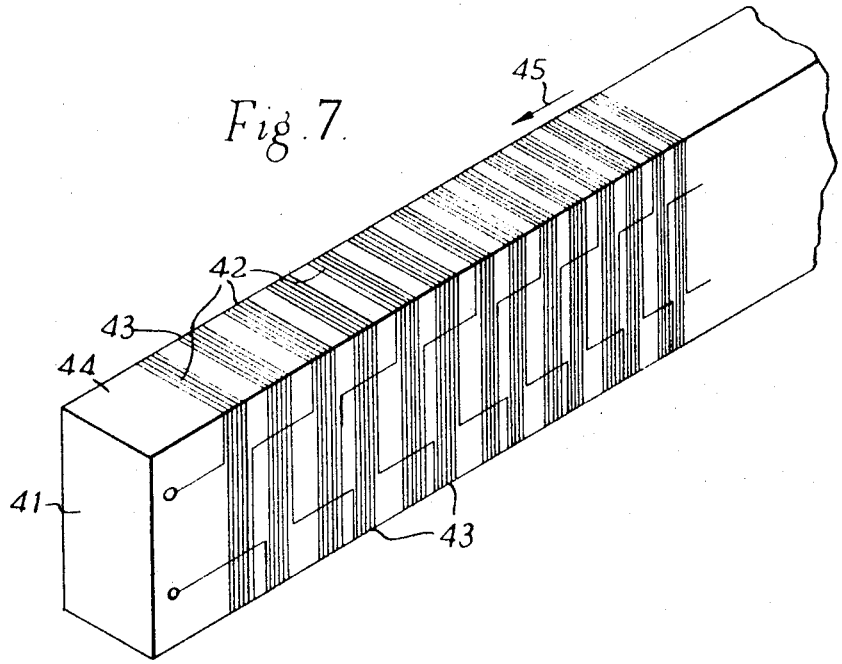

United States Patent Office 3,459,931
Patented Aug. 5, 1969

3,459,931
METHODS OF AND APPARATUS FOR THE CORRELATION OF TWO VARIABLES
William Edward Lerwill, Keston, and Nigel Allister Anstey, Chelsfield, England, assignors to Seismograph Service Corporation, Tulsa, Okla.
Application May 1, 1963, Ser. No. 277,211, now Patent No. 3,371,196, dated Feb. 27, 1968, which is a continuation-in-part of application Ser. No. 190,912, Apr. 30, 1962. Divided and this application Dec. 27, 1967, Ser. No. 693,799
Claims priority, application Great Britain, May 8, 1961, 16,687/61
Int. Cl. G06f 15/34
U.S. Cl. 235—181                    12 Claims

ABSTRACT OF THE DISCLOSURE

A method and apparatus for correlating two variables using a printed circuit having a waveform corresponding to one of the two variables. The other variable, which may be recorded along a magnetic tape or the like, is compared with the first variable, for example, by moving the tape past the printed circuit. The total voltage induced in the waveform of the printed circuit is measured continuously to determine the correlation between the variables.

---

This invention relates to methods of and apparatus for correlating two variables or time-varying quantities, while it is also concerned with the construction of apparatus and parts of such apparatus used for such correlation. This application is a division of U.S. application Ser. No. 277,211 filed on May 1, 1963 and assigned to the same assignee as the present invention, which application has now issued as Patent No. 3,371,196 and which in turn is a continuation-in-part of U.S. application Ser. No. 190,912 filed Apr. 30, 1962, now abandoned.

The present invention is more especially concerned with and will be more particularly described as applied to the cross-correlation of two time-varying quantities which may be represented by $g(t)$ and $r(t)$ and in which one of these is of a defined duration T. This involves the evaluation of the finite cross-correlation function $\phi_{gr}(\tau)$, where $$\phi_{gr}(\tau) = \int_0^T r(t) \cdot g(t+\tau) dt$$

and the finite auto-correlation function $\phi_{gg}(\tau)$, where $$\phi_{gg}(\tau) = \int_0^T g(t) \cdot g(t+\tau) dt$$

In recent years cross-correlation has become a powerful tool in many branches of science and technology and the present invention has application in many of these. In order to stress the breadth of application of the invention, some of these uses are itemized below.

First the problem of the detection of a signal in the presence of noise is shared by all branches of communications and echo-ranging. In those many cases where the characteristics of the signal are known and the noise may be taken as "white" and Gaussian, it is known that the filter which will produce the best signal-to-noise ratio is the so-called matched filter, whose frequency-transfer function is the complex conjugate of the Fourier spectrum of the signal. It is also known that the process of cross-correlating the combination of noise and signal against the signal itself is equivalent to a matched filter (see, for instance, Jones and Morrison, "Cross-correlation filtering," Geophysics, vol. 19, pages 660–683).

A particular case of matched filtering arises in pulse-compressive communication and echo-ranging systems. In one group of these systems, the transmitted signal is a swept-frequency quasi-sinusoid having many cycles of oscillation. This signal is time-compressed, after reception, in a dispersive waveguide or all-pass electric filter. Such systems are described by Huttmann (German Patent No. 768,068), Sproule and Hughes (British Patent No. 604,429), (United States Patent No. 2,463,328), Dicke (United States Patent No. 2,624,876), Darlington (United States Patent No. 2,678,997) and Cauer (German Patent No. 892,772).

It is known that the dispersive pulse-compressors described by the above do not in themselves represent true matched filtering, although the performance can be improved by the addition of supplementary frequency-amplitude filtering. True matched filtering, which may be obtained, for example, by cross-correlation, is, however, a most desirable type of pulse-compression (see, for instance, "The Theory and Design of Chirp Radars" by Klauder, Price, Darlington and Albersheim, published in the Bell System Technical Journal, July 1960, pages 745–808).

A second group of pulse-compressive echo-ranging systems also uses a swept-frequency transmitted signal, but the time-compression after reception is in this case effected directly by cross-correlation without reference to matched-filter theory. An application of such a system to seismic exploration is known as the "Vibroseis" system and is described in United States Patents Nos. 2,688,124, 2,808,577, 2,874,795, 2,910,134 and 2,981,928. A third group of pulse-compressive echo-ranging systems uses a random or pseudo-random signal in place of the swept-frequency transmission. In this case also the compression is best effected by cross-correlation (see, for instance, Fishbein and Rittenbach, "Correlation radar using pseudo-random modulation," published as a USASRDL Report, 1961).

It should be noted here that all pulse-compressive systems of communication and echo-ranging are within the scope of the present invention.

Another expression of the matched-filter concept is the ability of the cross-correlation process to provide pattern recognition. Thus cross-correlation by the methods which will be described in the present application can be used for the analysis of meteorological observations, market trends and similar functions, for which an interrelation or periodicity exists but is not obvious to the eye. It can also be used for pattern recognition in various forms of coding. Two examples of pattern recognition which are of particular interest are the automatic recognition of speech and the automatic identification of earthquakes. Our United States application Ser. No. 235,622, now abandoned, and U.S. Patent No. 3,271,732 describe adaptations of the invention to these purposes.

A related application of cross-correlation allows the determination of the travel time of a complicated disturbance between two points in space. The disturbance in this case may be, for instance, microseisms or air-borne sound waves from impacts or the like, or random noise. If the velocity of wave transmission is known this allows a direction-finding system, as is well known in the art. A cross-correlating device which uses the principles of the present invention for the determination of the velocities of elastic waves in the earth, using a noise source, is described in our United States application Ser. No. 252,979, now Patent No. 3,281,773.

The cross-correlation process which forms the basis of the present invention also represents an excellent filter of general utility. Thus cross-correlation against many cycles of a sine wave represents a peaked filter whose bandwidth is approximately inversely proportional to the duration of the sine wave sample; therefore very narrow bandwidths are possible. Such a filtering method has many applications in vibration analysis, continuous-wave echo-ranging, frequency modulated radar and communication techniques generally.

Cross-correlation is also of value in the determination of system transfer characteristics. This idea is based on the Wiener-Lee relation:

$$\phi_{gr}(\tau) = \int_{\infty}^{\infty} h(t) \cdot \phi_{gg}(\tau - t) dt$$

where $h(t)$ is the system weighting function. $\phi_{gg}$ is the auto-correlation of the input, and $\phi_{gr}$ is the cross-correlation of input and output. An adaptation of the cross-correlation process of the present invention to the evaluation of system transfer characteristics (particularly in the case where it is not desirable to inject a test signal of great amplitude) is described in our United States application Ser. No. 243,448, now abandoned.

The above list of applications of cross-correlation is not intended to limit the scope of the present invention, but it illustrates the wide range of the technological fields involved.

Various methods of evaluating the cross-correlation function are known. A digital calculation, for example, has many advantages when the basic data are in digital form. Three useful forms of analogue correlator are those described by Lee and Wiener ("Correlation Functions in Communication Applications," Electronics, June 1950, pages 86–92), Bennett and Peterson (United States patent specification No. 2,676,206), and Piety (United States patent specification No. 2,839,149). A fairly complete summary of the prior art may be found in "Experimental Correlograms and Fourier Transforms" by N. F. Barber, published by Pergamon Press, 1961.

The type of analogue correlator which has won the widest acceptance computes the cross-correlation function as a series of points for successive values of $\tau$, and thus involves the three operations of providing the delay $\tau$ (for instance, in a delay line of appropriate type), performing the multiplication of $r(t)$ and $g(t+\tau)$ (for instance, by electronic multiplication), and performing the integration (for instance, electrically). The great disadvantage of this method is that it is slow; a point must be computed (and all the basic data must be processed anew) for each of a large number of values of $\tau$.

It is an object of the present invention, on the other hand, to provide a method of and apparatus for obtaining a running cross-correlation between two variables, where the basic data are processed only once and the result can be made available almost instantaneously.

A further object of the invention is to provide a novel method and apparatus which can be used for correlating two signals very rapidly and with little effort.

Another object of the invention is the provision of a new and improved correlator which is of simple construction, which can be made small, compact and transportable and which can be manufactured inexpensively, while a still further object is to provide methods of and means for making important and novel parts of such apparatus.

Yet another object of the invention is the provision of a method and apparatus for correlation which have the great advantage of not requiring the production or processing of photographic films or records.

A still further object of the invention is to provide apparatus for correlating two variables one of which includes a property which is represented by variations in an energy field as a function of distance and which is to be correlated with a property of the other variable, which apparatus comprises a detector having a plurality of detecting elements which are arranged in space as a function of the said property of the second said variable and which are responsive to variations in the energy field of the first said variable to produce a corresponding output, the outputs of the detecting elements being combined to produce a detector output which represents a correlation of the two variables.

As will appear from the following description the energy field may take any of a wide range of forms. It may reach the apparatus of the invention and act on the detector directly, or it may be derived within the apparatus from a received signal representing the first said variable.

For the better understanding of the invention in the various aspects thereof reference will be made to the accompanying drawings, in which:

FIGURE 1 is a detail perspective view showing part of a detecting device comprising a magnetic play-back head and in which the energy field is produced by a magnetic tape passing over the head;

FIGURE 3 is a perspective view showing diagrammatically one method of constructing a magnetic play-back head;

FIGURE 4 is a front view showing diagrammatically a preferred method of supporting a magnetic play-back head and of guiding a magnetic tape over it;

FIGURE 6 is a detail plan view, to a larger scale, illustrating features of a conducting trace which may be provided on a head of the kind shown in FIGURE 5;

FIGURE 7 is a perspective view showing yet another form of magnetic play-back head;

Figure 2:
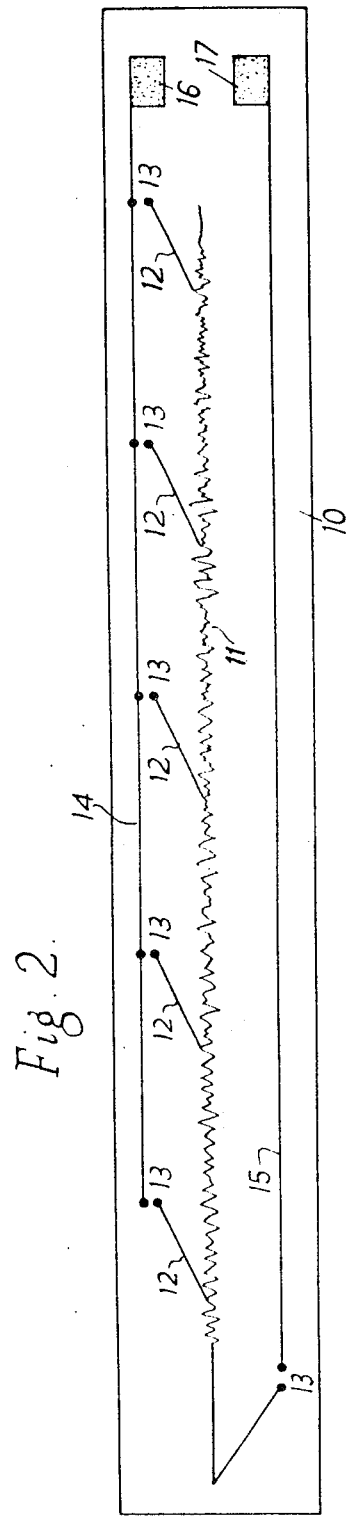
FIGURE 2 is a plan view showing a modified form of magnetic play-back head.

The invention will now be described, in greater detail, as applied to cross-correlation by a method employing the following steps:

Firstly, one of the variables, $r(t)$ must be expressed as variations in an energy field as a function of distance. In some cases the variable $r(t)$ will already exist in this form (e.g., in the direct cross-correlation of incident radio waves), but where this is not so (e.g., where the variable exists, as is often the case, as a voltage which is a function of time) it is necessary first to convert this so that it becomes a variation of some suitable energy field as a function of distance. Suitable forms of energy field are elastic, pressure, magnetic, electric, electromagnetic and radioactive.

In all suitable conversions, the result is a spatial distribution or pattern of some detectable energy field. As an example, this may be effected by using the original voltage-time signal to energize a magnetic recording head across which is passing a suitable magnetic recording medium at a predetermined velocity or rate-of-change of velocity. In this way the voltage-time signal is translated into a pattern of variations in magnetic intensity as a function of distance.

Alternatively, the original voltage-time signal may be used to drive a current through the launching transducer of a torsional or other delay line, so that, as the resultant strains propagate down the line, the signal is translated into a pattern of variations in strain as a function of distance.

Alternatively again, the original voltage-time signal may be translated into a pattern of pressure variations in an elastic substance or a pattern of electromagnetic waves in a dielectric.

As the second step in the process the other variable $g(t)$ is expressed as a spatial distribution or a pattern of the sensitivity of appropriate detecting means, using the same relationship between distance and time as was employed in the first step. Preferably this employs a continuous or substantially continuous detector whose sensitivity (as a function of distance along it) is programmed to conform to the variable $g(t)$. Alternatively, a plurality of elementary detectors may be used, each of which contributes an output programmed in the same way. Each elementary detector, or each element of the continuous detector, then contributes an output which represents the product of its own sensitivity and the magnitude of the property or state it is detecting.

As the third step, in the case of a plurality of elementary detectors, their output is then added (for instance, by their connection in series) so that the overall action then approximates to a continuous detector. The overall output is then the integral of that of the elements of the continuous detector (or of the elementary detectors) over the total length of the detecting pattern.

The output of the detecting pattern as the translated version of the signal $r(t)$ passes over it is the running cross-correlation function $\phi_{gr}(\tau)$, where $\tau$ is a measure of the relative positions in space of the signal corresponding to $r(t)$ and the detector pattern corresponding to $g(t)$.

This general method of evaluating the cross-correlation function will now be illustrated and described in greater detail with reference to the accompanying drawings.

Referring first to FIGURE 1, a magnetic tape 1 is here shown passing over a novel magnetic reproducing head or detector 2, which exemplifies and which represents a most important feature of this invention. The tape 1 may be a conventional magnetic-oxide-coated plastic tape (typically about 6–7 mm. wide), which is maintained in motion by a high quality tape transport mechanism (not shown). This may consist of a conventional assembly of supply and take-up reels, capstan and pinch roller, together with various guide pulleys. Alternatively the tape may be formed into an endless loop, with appropriate tensioning devices. In either case all the features of the tape transport (except the reproducing head or detector 2) may be of a kind which are well known in the art.

Before it reaches the head 2 the tape 1 is caused to pass over a conventional recording head (not shown) which, at least in the case of an endless tape, is preceded by a conventional erase head, both of which latter preferably have gaps capable of affecting the full width of the tape.

The tape 1 may be held in contact with the head 2 by a pressure pad or other means, but this will not be necessary if the head is given a slight degree of convex curvature, as will be described later, in which case the tension of the tape will hold it against the head.

The reproducing head 2, only part of which is shown in FIGURE 1, consists of a conducting line or trace 3 on an insulating board or support 4, the form of the conducting line 3 being a plot of the function $g(t)$ at an amplitude scale which confines the maximum amplitude of the function within the width of the tape, and at a time scale which corresponds exactly to the speed of the tape past the recording head.

If the signal $r(t)$, after suitable amplification or attenuation, is used to drive a current through the recording head (being added to a high-frequency bias current, as is well known in the art), then the signal $r(t)$ becomes translated into a pattern of variations in magnetic intensity as a function of distance along the tape 1. In particular, the variations of the normal component of flux out of the tape represents the first differential of the function $r(t)$, at a time scale which corresponds to the speed of the tape. The flux lines emerging from the tape 1, as it passes over the head 2, cut the conducting line or trace 3 and generate between the ends of each section or element thereof a voltage which is proportional to the product of the normal component of flux, the slope (assumed finite) of the conductor 3 across the length of the tape, and the speed of the tape.

The slope of the conductor 3 across the tape is itself the first differential of the function $g(t)$ as plotted, and the total voltage between the ends of the conducting line 3 is the integral of the voltages in the elements thereof. Consequently, this total voltage between the ends of the line 3 is proportional to the instantaneous value of the cross-correlation of the first differential of $g(t)$ with the first differential of $r(t)$. The variation of this voltage as the tape moves over the reproducing head 2 represents the variation of the finite cross-correlation of these two differentials as a function of $\tau$. Since all processes involved are linear, the variation of the cross-correlation of the signals themselves (rather than of their differentiated forms) may be obtained by a double integration with respect to $\tau$.

The above cross-correlation method and apparatus acquire their greatest value when the signals to be cross-correlated are each composed of many cycles; indeed most practical cases involve tens or even hundreds of cycles. It has been found that under these conditions the voltage output from the reproducing head described is well suited to normal amplifying equipment.

Several methods are available, according to this invention, for the manufacture of detectors or heads, such as the head 2 of FIGURE 1, having a conducting line 3 representing the function $g(t)$.

The first method which will be described is applicable where the function $g(t)$ is known in advance, or where a delay is permissible between the recording and correlation of data. This method comprises the following steps:

(1) The function $g(t)$ is plotted as a wiggly line using suitable amplitude and time scales by manual or machine plotting, or by recording an equivalent electrical signal by means of a galvonometric or other oscillograph, or by photography from the face of a cathode-ray tube.

(2) This graph or plot of the function $g(t)$, or a negative photograph of it, is used as the master for a standard printed-circuit technique. By this means, as is well-known in the printed-circuit art, a thin copper foil which is laminated to a suitable stable, electrically-insulating base material may be selectively etched, leaving a copper line representing the function $g(t)$.

(3) Suitabe electrical connections may be added, either after the printing process or by drafting on the original master plot.

An example of the appearance of a typical printed-circuit type of reproducing head is given in FIGURE 2. This comprises a base or board 10, preferably made of fiberglass, which carries a conducting line 11 having a number of electrical connections 12. These allow the selection of various parts of the function, as represented by sections of the line 11, by jumpering between pairs of small copper discs 13 which are also printed on the board 10, and which are connected by lines 14 and 15 to end contacts 16 and 17. The electrical output is taken from the contacts 16 and 17.

The copper strip may be plated with a hard metal to reduce wear, although this has not been found necessary in normal practice.

A second method of forming the conducting trace or line on a reproducing head is particularly applicable where the delay involved in making a printed circuit is not tolerable. According to this method, the function $g(t)$ is drawn to suitable amplitude and time scales on a semi-absorbent base material, which may be done with a standard pen motor or jet galvanometer using an electrically conducting ink. The resulting plot, after the addition of inked-in electrical connections to the conducting trace, may then be used as a reproducing head in the same manner as the printed circuit version.

A third method of forming the conducting line or trace is also applicable where the data must be processed very quickly, and it is illustrated in FIGURE 3. This uses a standard type of stylus motor 20 of the type which is used for writing on electro-sensitive paper such as that known by the name "Teledeltos." In this case, however, the stylus 21 is unusual in that it has two writing points 22 which are spaced apart by about ½ mm. in a direction at right angles to the stylus arm. The stylus points 22 are in contact with thin metal foil 23 which is supported on a stable base material 24 and is carried by the latter over rollers 25 and past the stylus. A high voltage is applied (through a suitable current-limiting resistor) between the stylus points 22 and the foil 23. As the foil is drawn past the stylus, which may be done by a conventional roller or drum drive (not shown) and as the stylus oscillates in conformity with the electrical equivalent of the signal $g(t)$, the foil is vaporized along two fine lines 26 and an isolated wiggly strip 27 is left between these lines. This isolated strip 27 becomes the conducting trace of the reproducing head. The action of the head is not appreciably affected by the presence of the remainder of the foil 23.

The apparatus for moving the foil 23 past the stylus 21 may be separate from the transport for the magnetic tape (so that the reproducing head made in it must be transferred to the tape transport apparatus and mounted in the latter), or the apparatus for driving the tape and that for driving the foil may be integrated into one machine. It is, of course, important that the drive speed for the tape should match the drive speed for the foil (or, otherwise expressed, that the time scales of the functions $g(t)$ and $r(t)$ should be the same).

A fourth method has also been used for the construction of the reproducing head, which in this case is done with fine wire. This is especially applicable to certain classes of function $g(t)$ and it will be described later in the present specification.

FIGURE 4 illustrates diagrammatically a typical arrangement for supporting the reproducing head (here indicated at 30). Whichever type of head is used it is mounted on a rigid support member 31 and the magnetic tape, which is here shown at 32, is passed over it and over a recording head 33. The support 31 forms the reproducing head 30 into a slight convex arc; it has been found that pressure pads are unnecessary with this arrangement.

Unless the base material on which the conducting strip is formed is itself very thin, it is necessary to take into account (when plotting out the function $g(t)$) the distortion of the time scale which is caused by the slight convex arc. The base material itself should be of sufficient dimensional stability to make negligible the effect of changes in temperature or humidity, and fiberglass and melamine have been found suitable.

Tape guides (not shown) may be added to the reproducing head support 31 for the lateral constraint of the tape 32, but in practice it has been found that the use of grooved guide pulleys 34 is sufficient and that the tape rides over the head 30 without any tendency to lateral motion.

It will be apparent that this arrangement represents an eminently practical method of evaluating the finite cross-correlation function. The production of printed-circuit reproducing heads is straightforward and inexpensive, and the operation of the apparatus is simple. No critical adjustment or alignment of trace axes is necessary (in contradistinction to photographic methods), and the function $r(t)$ may be recorded on the tape with no more than the usual attention to its amplitude level. The maximum amplitude of the function $g(t)$, as expressed by the conducting strip, may be made slightly less than the width of the tape (or the magnetized portion of the latter), to allow for a mechanical tolerance in the tape guides or rollers.

Normally, the tape may be driven by a standard drive system using a synchronous motor controlled from a frequency standard. For special applications a servo-controlled speed correction system may be employed. For this purpose a tape wider than the correlating reproducing head may be used, and a narrow time track may be recorded by a conventional recording head near the edge of this tape. The servo error signal may then be derived, for instance, from a phase comparison of the outputs of two spaced conventional playback heads mounted over this timing track.

Whichever type of drive system is used, its elements are well known in the art.

The nominal tape speed is a function of the frequency range represented by $g(t)$ and of the practical limitations of making a very fine conducting strip. At the present time, the practical minimum for the width of a printed-circuit strip is about 0.005 inch, and a tape speed of 3.75 inches per second has been found appropriate to the frequency range 10–150 c.p.s. for a tape width of ¼ inch.

It follows from the nature of the cross-correlation process that equivalent linear filtering operations may be performed before or after correlation. It has already been stated that the normal processes of magnetic induction produce a differentiation of each of the variables being correlated, and that this may be compensated by a double integration after correlation. Conveniently, this may be done by a two-stage RC integrator in the amplifier which follows and is connected to the reproducing head.

Alternatively, the equivalent effect may be obtained by passing both $r(t)$ and $g(t)$ through single-stage integrators before correlating them, or by passing one of them through a two-stage integrator before correlation, or by passing one of them through a single-stage integrator before correlation and by passing the output after correlation through a further single-stage integrator.

Which method is used depends on the usual system signal-to-noise considerations, and on the nature of $g(t)$. If, for instance, $g(t)$ is rich in high frequencies, it may be desirable to integrate first (i.e. to give a low-frequency pre-emphasis) in order to keep the amplitudes of high frequencies and low frequencies on the conducting strip both large compared with the thickness of the strip.

Figure 5:
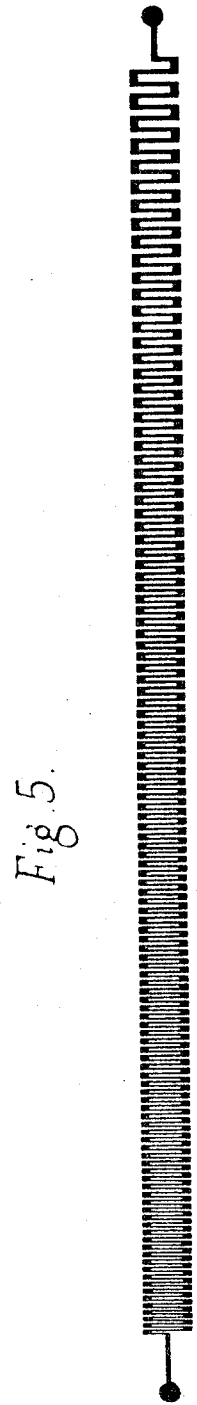
FIGURE 5 is a plan view showing another form of magnetic play-back head.

Particular cases where it may be desirable to integrate $g(t)$ before making the conducting strip occur when the slope of $g(t)$ is not everywhere finite (for example, when $g(t)$ has a square or rectangular waveform). Alternatively, the strip may be formed into a rectangular waveform, this being followed by two stages of integration. This is the more convenient course when $g(t)$ is obtained by the plotting of a set of figures. An example of a square-wave correlating head which may be produced by the printed-circuit process is shown in FIGURE 5. This represents a swept-frequency signal of the type which may be used in several pulse-compressive echo-ranging and communication systems.

Certain features of square-wave heads, such as that shown in FIGURE 3, warrant special mention. First, it is clear that provision for mechanical tolerance in the tape guides may be effected by making the amplitude of the square wave slightly greater than the width of the tape or of the magnetized track thereon. For other heads which do not include a square waveform as previously mentioned, it is normally slightly less.

Second, with a square-wave head it becomes possible to connect the sensitive elements of the detector (i.e. the "sides" of the square wave) in parallel rather than in series. This, however, involves making connections through the base material of the head, while it normally offers no practical advantage.

Third, if $g(t)$ is a long sinusoid of frequency $f$, the head produces virtually no output when $r(t)$ is a sinusoid of frequency $2f$, $3f$, $4f$, and c., but if $g(t)$ is a square wave of fundamental frequency $f$, the head produces an appreciable output (defined by the normal Fourier treatment) at frequencies $3f$, $5f$, $7f$, $9f$, and c. In some applications the sensitivity to the third harmonic, in particular, is a nuisance. This may be overcome by increasing the thickness of the strip so that it represents one-third of a wavelength, and this is entirely feasible in the case of a swept-frequency correlating head. An illustration of the form of a few cycles of such a head is shown in FIGURE 6, in which the relation between the widths and distances between the sections of the conducting strip 38 are shown as fractions of its wavelength $x$. This head has a sensitivity to the fundamental which is only $\sqrt{3/2}$ less than that of a simple square-wave head; the only harmonic output is from the 5th, 7th, 11th, 13th . . . and $c$, harmonics, and this is small.

In the case when $g(t)$ is of the general type of a rectangular waveform, and is known in advance, it is feasible to make the head by winding with fine wire. This is illustrated in FIGURE 7, wherein the base material of a printed circuit head is replaced by a long insulating former 41. This may consist, for example, of an insulating block 24 inches long and ½ inch by ¼ inch rectangular in section, while the metal strip is replaced by two windings 42 and 43 of fine insulated wire. One winding 42 has one group of one or more turns for each positive half-cycle of the function $g(t)$, while the other winding 43 has a similar group of turns for each negative half-cycle. The groups are spaced from each other in accordance with the function $g(t)$; the thickness of the groups (e.g., the number of turns per group) may be adjusted, if desired, to accomplish the elimination of a particular class of harmonics, as described above.

The successive windings progress from one end of the former 41 to the other, but each second winding 43 is either wound in the opposite sense to the first winding 42 or it is connected electrically in series with the first winding in such manner that the voltages induced by the positive half-cycles of the magnetic field in one winding reinforce or add to those induced by the negative half-cycles in the other.

After winding, the turns are fixed in place (for example, by coating with an epoxy resin) to form a smooth face on one side 44 of the insulating former 41, so as to provide for intimate contact with the magnetic tape (not shown) which is adapted to pass along the face 44 in the direction indicated by the arrow 45. The bearing face 44 of the playback head may be coated with a hard material to reduce wear.

It is evident that the action of this wound type of head is similar to that of the printed-circuit type of square-wave head, in that one group of turns of the wound head corresponds to one transverse portion or detecting element of the strip in the printed-circuit head. However, in the case when the thickness of the strip or of the group of wires is adjusted to give elimination of a harmonic frequency, the equivalence is not exact. For, if the adjustment of the effective thickness of the group of turns is effected by varying the number of turns in the group, there will tend to be more turns at the low frequencies; this may be used (in combination with phase adjustment, discussed later) to offset the need for the second integration of the output from the head. If this improvement in the low-frequency sensitivity is not to be made in a few coarse increments, it is desirable that many turns of fine wire should be used (at least, in the low-frequency sections of the head). Thus FIGURE 7, which shows a swept-frequency head with six turns per group at the low-frequency end, is illustrative only.

In the case when $g(t)$ is a periodic function of generally rectangular type, there may be an undesired peak in the response of the head at a high frequency whose wavelength on the tape matches the spacing between the turns of wire within each group (rather than matching the groups themselves). This can be overcome by winding the turns at an angle slightly more or less than 90° to the direction of tape travel, or by making a corresponding adjustment to the azimuth of the recording head gap, or by using an appropriately wide recording head gap.

The technique of winding so that the turns cross the tape at an angle other than 90° may be extended to cover functions $g(t)$ other than generally rectangular waveforms. As an example, it is quite feasible to construct a triangular waveform representing the integral of a rectangular waveform. It is also possible to approximate to other functions by grading the spacing or the azimuth of the turns within each group.

In the case of those functions $g(t)$ where the low-frequency and high-frequency contributions tend to be spaced apart (for example, in a swept-frequency waveform), a novel form of frequency-selective filtering, which represents a useful feature of the present invention, is possible. This filtering may be effected in a simple manner merely by lifting the tape away from the long reproducing head over a part of the latter's length, or by inserting a magnetic shield between the tape and the reproducing head over a portion of the length. In this way the effect of high-pass, low-pass, band-pass and band-stop filtering can be very quickly tested.

Alternatively, the desired attenuation characteristic may be designed into the reproducing head itself. In the case of the printed-circuit head, for instance, this means a variation with frequency of the amplitude of the square, sine or other waveform described by the printed-circuit strip. Thus heads can be designed which have any desired frequency-selective characteristic within the band of frequencies covered by the function $g(t)$.

It is important to note that this frequency-selective filtering is achieved without any phase shift of the components constituting the signal. Thus the filtering is quite different in this respect from that normally applied by electrical filters and, although other methods of obtaining zero-phase-shift behavior are known in the art, none has the operational simplicity of that provided by the present invention. The method is particularly attractive for certain cases where notch filtering is required; a smooth notch may be designed into a swept-frequency head without the 180° phase shift which is normally encountered in notch filters.

The present invention is not restricted to zero-phase-shift filtering, since the linear distribution of the several detecting elements or groups may be modified from the form previously described and may be made to be equivalent to any desired variation of phase-shift with frequency. This is illustrated by the case where $g(t)$ is a swept-frequency waveform but where an integrated version of $g(t)$ is used as the equation for the reproducing head. This, as has been previously discussed, is one possibility for providing one stage of the necessary double integration. In this case the cycles of the reproducing head lag 90° behind equivalent cycles of a plot of $g(t)$, and the amplitude of the reproducing head decreases uniformly with increasing frequency. In general, the amount by which the cycles of the reproducing head lead or lag the cycles of a plot of the unfiltered function $g(t)$ can be adjusted within broad limits according to a wide variety of schemes, while the amplitude of the reproducing head can be adjusted quite independently. Cross-correlation with waveforms filtered independently in amplitude and phase is therefore possible; this is a highly important feature of the invention.

One useful application of these facts is the phase-compensation of an imperfect integrating amplifier. In the case where the amplifier following the reproducing head is required to provide two stages of integration, it is easier to provide the falling amplitude characteristic than it is to provide the 180° phase lag, particularly at low frequencies. Attempts to approximate the necessary phase behavior at the low frequencies normally involve an unwieldy amount of gain at still lower frequencies (which are not themselves of interest). A solution to this problem is given by the following steps:

(1) An integrating time-constant is adopted which gives a reasonable compromise between phase fidelity and low-frequency noise; this will automatically give good amplitude equalization.

(2) Assuming that the function $g(t)$ has already been recorded on tape, then this tape is played back through an amplifier having one stage of the adopted integrating circuit, and the resulting signal is recorded on another tape.

(3) The second tape is then played back through the same amplifier, and the resulting signal is used to drive the oscillograph which makes the master for the printed-circuit, or to drive the pen motor which makes the conducting strip directly.

(4) At this stage it is evident that the low-frequency components of the waveform of the reproducing head lead their true positions in the function $g(t)$, because of the imperfect lagging characteristics of the playback equalization processes. As the tape bearing the equivalent of the function $r(t)$ approaches the reproducing head, however, this lead appears as a lag, and the low-frequency components are detected late.

(5) Finally, in the amplifier following the reproducing head, the low-frequency components in the correlation waveform undergo the lead associated with the imperfect integration; this lead offsets the lag in detection, and all components emerge in good phase relationship.

The foregoing paragraphs are concerned with the provision of frequency-selective action within the band of frequencies represented (at significant amplitude) by the function $g(t)$. As stated in the introduction to this specification, the correlation process is a powerful tool for the attenuation of frequencies outside this band; this leads to a consideration of the function $g(t)$ appropriate to particular filtering problems. When $g(t)$ is a sinusoid, and the reproducing head then represents many cycles of this sinusoidal waveform, the correlation process represents a very highly selective filter; it is entirely feasible to use a reproducing head which yields a Q of several thousand at 100 c.p.s. A coarse variation of the filter peak frequency can be achieved with a plurality of inexpensive reproducing heads (e.g., of the printed-circuit type), and a fine variation can be achieved by changing the speed of the tape past the recording head. Variation in the effective Q of the filter can be achieved by selecting tape arranged along the length of the head.

A filter which has a narrow flat top and steep sides may be obtained by cross-correlating against a long swept-frequency signal, swept between narrow limits. If the input to the filter (i.e. the function $r(t)$ in this case) is random noise, then the output from the correlation process will be narrow-band noise. This may itself be used as the reference signal $g(t)$ for further filtering studies; the use of narrow-band noise signals has several advantages over the use of swept-frequency signals in some applications.

The foregoing method of evaluating the finite cross-correlation function magnetically is appropriate to real-time operation in the frequency range of a few cycles per second to a few kilocycles per second. Operation outside this frequency range can be achieved by recording the data at one speed and playing back at another.

Where magnetic recording is mentioned in the foregoing description it is understood to signify the conventional longitudinal method of recording. However, the method is not restricted to this type of recording but may be modified to suit perpendicular recordings. Further, the method is not restricted to the case of direct magnetic recording, but is applicable also to amplitude-modulated, frequency-modulated, pulse-width-modulated and other systems of recording, all of which, where appropriate, are to be construed as coming within the scope of the appended claims.

A second device which may be used to illustrate our general method of evaluating the cross-correlation function, and which is applicable to a frequency range between a few tens of kilocycles per second up to a few megacycles per second, involves the use of magnetostrictive delay lines.

Figure 8:
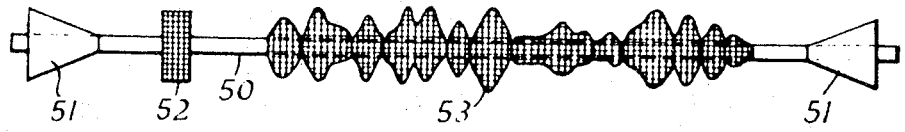
FIGURE 8 shows diagrammatically a magnetostrictive device which exemplifies an important feature of the present invention.

Referring now to FIGURE 8, a rod, wire or tube 50, of suitable magnetostrictive material, is supported between damping pads or members 51. These constitute a matched resistor load for strain waves in the wire or tube 50, and substantially eliminate reflections from the ends.

In a first form of such apparatus, as illustrated in FIGURE 8, the rod, wire or tube 50, (hereinafter called the delay member) is first longitudinally magnetized so that its remanent magnetism lies on a suitable part of the B–H curve (or is maintained in this state by a suitably large external magnet). The launching transducer 52 comprises a simple coil of wire, and a pulse of current through this coil produces a pulse of longitudinal strain in the delay member 50. This strain pulse travels in both directions along the delay member 50 at a velocity which is approximately 0.2 inch per microsecond. If the current through the launching transducer 52 is caused to vary in accordance with the function $r(t)$, a corresponding pattern of strain variations is transmitted down the delay member 52 and is finally absorbed in the matching terminations 51. A second coil of wire similar to the coil 52 but spaced away from it down the delay member 50 will have induced in it a voltage which represents a delayed and modified form of the function $r(t)$. This effect is known per se, and it represents one of the techniques used in conventional magnetostrictive delay-line practice.

Figure 9:
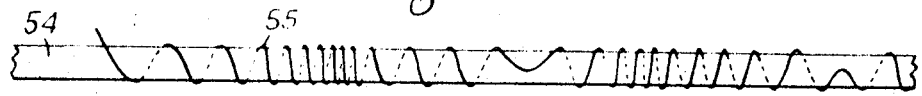
FIGURE 9 is an extended view illustrating a feature of the design of the device shown in FIGURE 8.

To apply this principle to the present invention, the detecting or pick-off transducer is not the simple coil used in conventional practice, but is a long coil 53 whose length represents the duration of the function $g(t)$ (at the delay-member velocity) and whose sensitivity is adjusted as a function of its length according to the function $g(t)$. The adjustment of the sensitivity can conveniently be effected by variations in the "turns density," or number of turns per unit length, of the coil. As with the wound head in the magnetic type of correlator, separate coils must be used for the negative and positive half-cyles of the function $g(t)$, or the winding direction must be reversed at every zero-crossing of the function $g(t)$. An expanded diagrammatic illustration of the type of winding in the coil 53 is given in FIGURE 9, where a cylindrical former 54 is shown supporting a winding 55 of the type which reverses direction at the zero-crossings.

This type of detector is appropriate to the case when the function $g(t)$ is known well in advance, and is sufficiently important, or recurs sufficiently often, to warrant the winding of a special coil. Otherwise, as in the modification shown in FIGURE 10, the long coil 53 may be replaced by a plurality of short coils 56 which are spaced continuously or at intervals along the delay member 50, and which have their contribution to the combined output programmed (by the addition of resistances or otherwise) according to the function $g(t)$. Such elementary coils (which may, for example, be cast in resin, complete with shield, in the form of a disc with a central hole for the delay member 50) may be assembled very readily, and their sensitivity may be programmed by a simple switched-resistor arrangement. The electrical configuration may involve series connection of the coils (in which case shunt resistors are used) or parallel connection (in which case series resistors are used).

It is known in the art that the pulse shape obtained from an individual pick-off coil is a function of the length of the coil and of the inductance and length of the launching coil. These variables may be simply adjusted to give an overall pulse-shaping effect which approximates to double differentiation (see, for instance, "transistorized magnetostrictive delay-line stores," by Showell, Barrow and Collis, AEI Engineering Review, July 1960, pp. 58–67). Under these conditions the cross-correlation function can be obtained, as for the magnetic case, by a double integration with respect to $\tau$. Various possibilities for this integration exist, and the considerations previously detailed for the magnetic illustration of the method can readily be adapted to this magnetostrictive case.

A second form of magnetostrictive apparatus, which is otherwise similar in essence to the first, does not involve the overall magnetization of the delay member. In this form a local polarizing magnet is provided for the launching coil and also for the long detecting coil, or for each of the short coils which together make up the long detecting coil. Launching transducers of this type, and resin-cast individual short detecting coils, are available commercially from Cossor Radar and Electronics Ltd. A related technique involves electromagnetic biasing, achieved by the use of a standing direct current through the coils.

Figure 10:
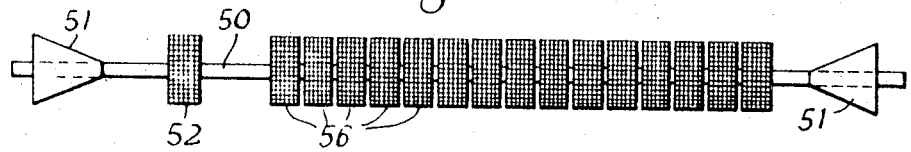
FIGURE 10 is a view similar to FIGURE 8 but showing a modification.

A third form of magnetostrictive apparatus involves the propagation of torsional (rather than longitudinal) strain pulses along the delay member; such torsional pulses are associated with a lower velocity. The apparatus is similar to that described as the first forms of magnetostrictive apparatus, as shown in FIGURES 8 and 10, except that the magnetization of the delay member is circular rather than longitudinal. This magnetization may be maintained by the continuous passage of a direct current through the member 50 during operation. The launching and detecting coils are similar to those described for the first form; the longitudinal field of the launching coil combines with the circular field of the delay member to produce a helical field, and the delay member twists locally in response to this field.

The material used for the delay member must represent a good compromise between magnetostrictive properties (and their variation with temperature), pulse transmission properties (particularly attenuation and dispersion) and the temperature coefficient of velocity. These considerations have been studied in the literature, and alloys known as Nilo 45 and Permendur have been accepted as preferable to nickel.

It is sometimes necessary to introduce corrections to the function $g(t)$ before representing it by the sensitivity of the detecting coil. In the second form of the apparatus, described above, for instance, there is a very slight local change in the velocity of propagation (and its variation with temperature) when magnets are added to the delay member, and for accurate work the effective velocity must be determined with the pick-off transducers in position. There is also a loss associated with the normal propagation in the delay member, and an additional loss associated with the slight loading effect of the detecting coils; these losses can be measured and can be offset by appropriate compensation of the function $g(t)$.

For some applications of this magnetostrictive apparatus velocity corrections are unnecessary; this is particularly true in pulse-compressive echo-ranging applications, where the transmitted signal may be generated in the correlator itself. This is done by passing a current pulse through the long coil and by detecting the resulting strain variations with a short coil similar to the launching transducer but at the other end of the delay member. This ability to use a pulse-compressing correlator as a pulse-extending generator is common to all the forms of apparatus described in this specification. In some cases (particularly the magnetostrictive case) it is also possible to achieve pulse-compression by feeding the signal $r(t)$ into the long transducer and by detecting the resultant disturbance at the short transducer.

An application of a magnetostrictive correlator to a radio ranging system is described in our British application No. 17,628/62 filed May 8, 1962. Such applications become feasible when the intermediate frequency can be within the frequency range of the magnetostrictive device and when this intermediate frequency allows sufficient resolution. For some applications, however, it is desirable to perform the cross-correlation at radio frequencies. One such application is the use of a "stationary" satellite for the relay of TV and similar material. In the early stages of development, at least, a satellite stationary over the equatorial Atlantic is likely to be used for relay between the North American and European continents. Whether the satellite is to be an active or a passive repeater, pulse-compression techniques commend themselves. It may be desirable to perform the cross-correlation in the receiving aerial or antenna, and this is feasible since the direction of the received wave is known and its inclination to the horizon (about 90° in the case quoted) is reasonable.

Figure 11:
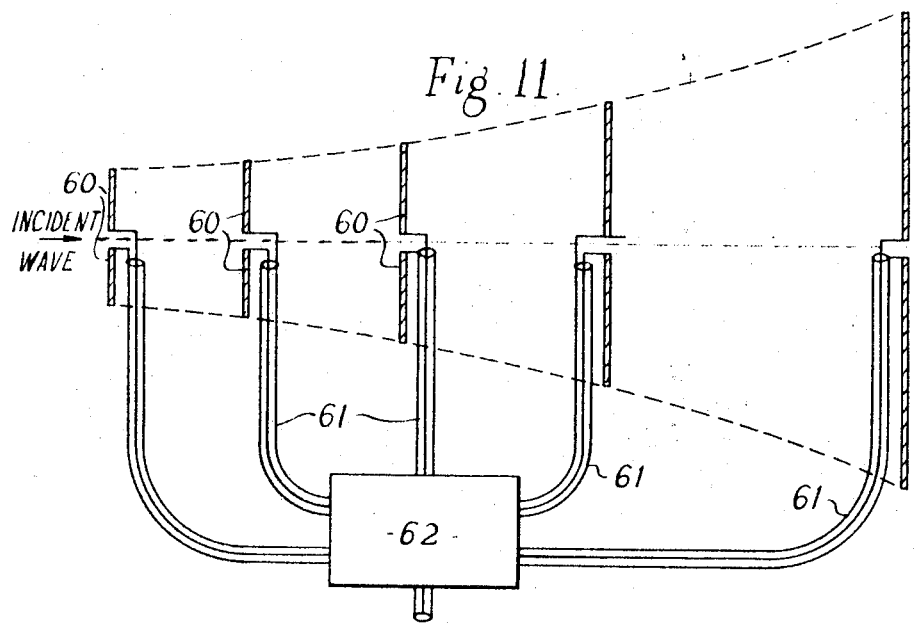
FIGURE 11 shows diagrammatically another application of the invention.

An aerial array which can be used for cross-correlation at radio frequencies, and which exemplifies this application of the invention, is shown in FIGURE 11 for the case when $g(t)$ is a swept-frequency or complex signal with frequency increasing with time. The array shown has as many elements 60 (in the form of dipoles) as there are half-cycles in the function $g(t)$, so that elements may be regarded as spaced at half-wavelength intervals (though in fact the wavelength varies). Thus, the spacing and sensitivities of the elements 60 represents or is a function of the frequency pattern and velocity of the signal $g(t)$. The sensitivities of the elements 60 are adjusted, in this case, to be equal in the $\tau=0$ condition; this means that the length as well as the separation of the elements is half a wavelength, and that alternate elements are reversed in phase. This is represented by the manner of connection of the elements 60 to the feeder cables shown at 61. The latter are conveniently coaxial cables, all nominally of the same length, and they are connected together at an appropriately matched junction-box 62 so that the outputs of the elements 60 are combined or integrated in the junction-box. In practice the lengths of the feeder cables may be adjusted experimentally for optimum results.

For the case when the axis of the array cannot be inclined at right angles to the incoming wave-front, the elements may be tilted, and/or the distances between them increased, to compensate this inclination. The elements themselves may be vertical or horizontal, depending on the polarization of the incoming wave, and a plurality of arrays may be used to improve the signal-to-noise ratio, as is well known.

Figure 12:
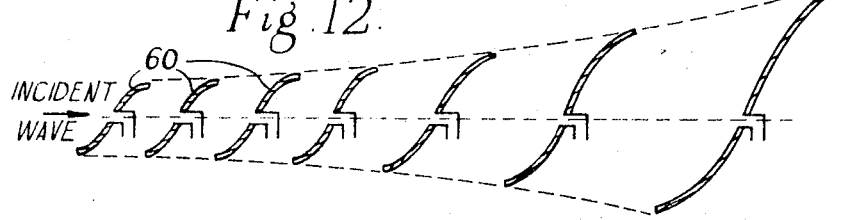
FIGURE 12 shows, purely diagrammatically, a modification of the arrangement shown in FIGURE 11.

The elements 60 may be shaped, as is illustrated diagrammatically in FIGURE 12, in order to provide cross-correlation against a more nearly sinusoidal swept-frequency function.

It will be obvious to those skilled in the art that many variations on this basic arrangement are feasible. For instance, an aerial or antenna of the well-known fishbone type, where the connections of the individual elements to the common output are made by loose coupling to a non-resonant line, could be adapted to become a cross-correlating device according to the method herein described. As before, the length and nominal separation of the elements are arranged to represent half a wavelength at the overlay or $\tau=0$ condition, although the actual separation of the elements may be modified on an experimental basis to cater for variations in the effective velocity along the non-resonant line.

The aerials or antennae described above might well have a large overall extent; to compress a swept-frequency pulse of a duration of 1 microsecond, for instance, the overall length of the array would be of the order of 1000 ft., but this is entirely feasible for an installation adapted to satellite or other special-purpose communication.

In the various applications of the invention which have been described above, the detector produces an output in the form of an electrical voltage or current. This output may, after any necessary amplification and filtering or other control, be displayed visually by any suitable means such as by an oscilloscope, or it may be recorded in any convenient way, such as by direct electro-mechanical or photographic recording or by photographing the picture on a cathode ray tube or by magnetic recording.

While the present invention has been described in connection with the details of three particular embodiments thereof (namely magnetic, magnetostrictive and radio correlation), it should be understood that these details are not intended to limit the invention. For instance, the use of an electrostatic energy field preserved in thermoplastic tape, in combination with a long detector of suitably programmed sensitivity, falls within the scope of the invention. So also does the use of a pressure field in a fluid, in combination with a long detector (or an assembly of elementary detectors) of suitably programmed sensitivity.

We claim:

1. Apparatus for correlating two variables, a first of which includes a property which is represented by variations in an energy field as a function of distance and which is to be correlated with a property of the second variable, wherein the apparatus includes a detector, said detector comprising an insulating base, a continuous conductor formed as printed-circuit on said base and having a waveform which includes a plurality of detecting elements arranged in space as a function of the said property of the second variable, said waveform having output connections, said detecting elements being responsive to variations in the energy field of the first said variable to produce a corresponding output, means for producing relative movement between said detector and said energy field, and outputs of the detecting elements appearing across the output connections of said waveform and being combined to produce a detector output which represents a correlation of the two variables.

2. Apparatus for cross-correlating two variables one of which $r(t)$ includes a property which is represented by variations in an energy field as a function of distance and which is to be correlated with a property of the other variable $g(t)$, wherein the apparatus includes a detector, said detector comprising an insulating base, a continuous conductor formed as a printed-circuit and having a waveform which includes a plurality of detecting elements, means for relatively moving the detector and the energy field, said detecting elements being spaced along a line which is parallel to the direction of relative movement of the energy field with respect to the detector, the spacing between the detecting elements and the output sensitivities thereof representing a predetermined function of the variable $g(t)$ such that each detecting element produces an output which represents a product of its own output sensitivity and the magnitude of the said property of the variable $r(t)$, and means for measuring the outputs of the detecting elements appearing across said waveform to produce an overall detector output which represents the running cross-correlation function of the two variables.

3. Apparatus for correlating two variables, a first of which is recorded on magnetic record tape and includes a component which has a frequency of oscillation which varies along a length of the tape, wherein the apparatus includes an elongated magnetic play-back head, said head comprising an insulating base, a continuous conductor formed as a printed-circuit waveform upon said base, and means for passing the tape past the head longitudinally with respect to the latter in order to induce voltages in said conductor from the field recorded on said tape, said printed-circuit waveform comprising a plurality of conducting elements which are arranged transversely across the head and which are spaced apart at distances which vary along the head in accordance with a function of the second of said variables, said printed-circuit waveform having output connections.

4. Apparatus as claimed in claim 3, wherein the voltages induced in the conducting elements by the field on said tape appear across the output connections of said waveform, such that the total output appearing across said output connections is a maximum when the pattern of the recorded variable or component thereof on the magnetic record passing over the head corresponds to the distribution of the conducting elements along the head.

5. Apparatus for correlating two variables, wherein the apparatus comprises an extended base having a continuous conductor formed as a printed circuit thereon, said conductor having a predetermined waveform and forming a transducer whose sensitivity as a function of distance is programmed according to a property of a first of the variables, means for applying a signal representing the other of the variables to the transducer to produce along said conductor an energy field which as a function of distance represents a second of the variables, means for relatively moving said energy field and said conductor, and means for measuring the effect of said field upon said conductor as said movement occurs to provide an output which is a function of the correlation.

6. A magnetic play-back head adapted for use in correlating two variables wherein the head comprises an elongated insulating support carrying a conducting trace in the form of a printed circuit, said trace including a plurality of conducting elements which extend transversely of the length of the head and which are spaced apart along the head at varying spacings determined by a function of a first of the variables, said trace having a pair of output connections at the respective ends thereof, means for subjecting said trace to a non-uniform magnetic field at least a portion of which is distributed as a function of the second variable, and means for moving said field relative to said trace, whereby voltages induced in the elements by the magnetic field are algebraically added or integrated to produce an output at the output connections which is a maximum when the form of the magnetic field corresponds most nearly with the arrangement and spacing of the conducting elements along the head.

7. A method for correlating two variables a first of which possesses a characteristic varying as a function of distance or space, said method comprising the steps of producing a detector representing the second variable by forming a printed-circuit conductor on an insulating base as a waveform, said detector having a sensitivity to said characteristic varying with distance as a function of the second variable, subjecting said detector to the influence of said first variable to develop directly from said detector an output proportional to said characteristic and controlled by the spatial relationship between the first variable and the detector, altering said spatial relationship, and determining the value of the output from said detector as said spatial relationship is altered in order to determine the correlation function between the two variables.

8. A method for correlating two variables a first of which possesses a characteristic varying with time, said method comprising the steps of translating said first variable into an energy field having a property to be detected which property varies as a function of distance, producing a detector representing the second variable by forming a printed-circuit conductor on an insulating base as a waveform, said detector having a sensitivity to said property varying with distance as a function of said second variable, subjecting said detector to the influence of said energy field to induce directly in said detector a signal proportional to said characteristic and controlled by the spatial relationship between the energy field and the detector, altering said spatial relationship, and determining the maximum value of the output from said detector as said spatial relationship is altered in order to determine the peak of the correlation between the two variables.

9. The method defined by claim 8 wherein the translating step is performed by recording the first variable upon a medium having said energy field adjacent thereto, the detector being subjected to the influence of said field by positioning said medium adjacent the detector, and the spatial relationship being altered by moving said medium past said detector.

10. The method defined by claim 9 wherein the recording is made magnetically upon a magnetizable medium so that the energy field is a magnetic field which varies in intensity with distance in a manner governed by the variations in said characteristic of said first variable.

11. A method for correlating two variables a first of which comprises an energy field having an intensity varying as a function of distance, said method comprising the step of producing a detector representing the second variable by forming a printed-circuit conductor on an insulating base as a waveform, said detector having a sensitivity to said field varying with distance as a function of said second variable, inducing directly in said detector an electrical signal having an amplitude controlled by the spatial relationship between the energy field and the detector, altering said spatial relationship, and determining the value of the electrical signal from said detector as said spatial relationship is altered in order to determine the correlation between the two variables.

12. The method defined by claim 11 wherein the energy field is a magnetic field recorded on a magnetizable medium, the inducing step being performed by positioning said detector in the vicinity of said medium and the spatial relationship being altered by moving said medium relative to said detector.

References Cited

UNITED STATES PATENTS

| | | | |
|---|---|---|---|
| 3,174,142 | 3/1965 | Mallinckrodt | 235—181 X |
| 3,199,106 | 8/1965 | Karr | 343—17.2 |
| 3,297,981 | 1/1967 | Harney et al. | 235—181 X |
| 3,345,504 | 10/1967 | Doty | 235—181 |

MALCOLM A. MORRISON, Primary Examiner

FELIX D. GRUBER, Assistant Examiner

U.S. Cl. X.R.

29—603; 324—77; 340—174